Figure 2:
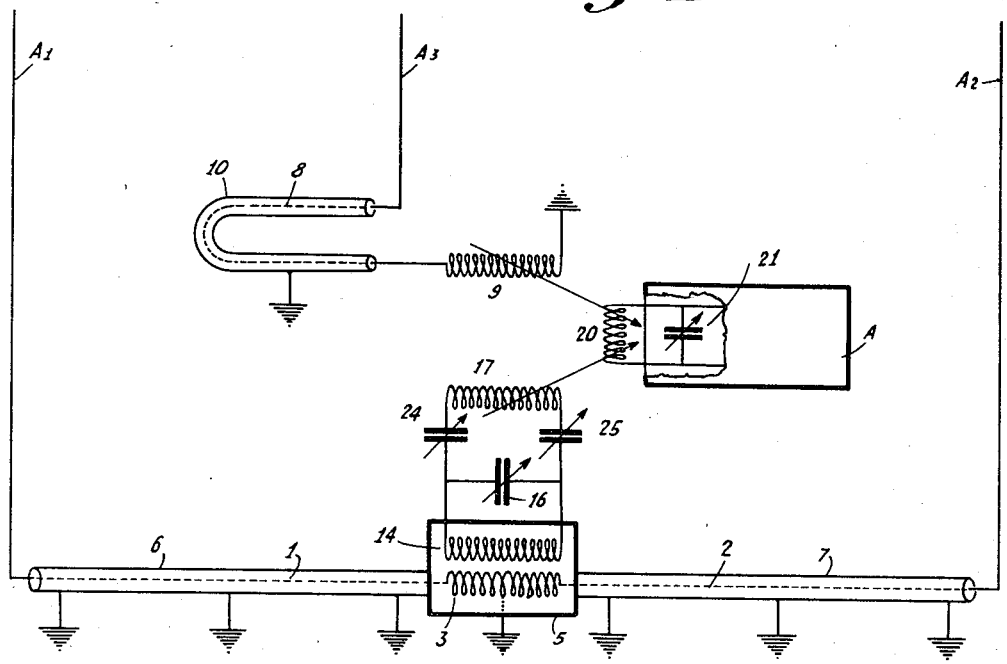

Dec. 12, 1933.  T. L. ECKERSLEY  1,938,624

DIRECTION FINDER

Filed April 25, 1931

INVENTOR
THOMAS L. ECKERSLEY
BY *H. S. Grover*
ATTORNEY

Patented Dec. 12, 1933

1,938,624

UNITED STATES PATENT OFFICE 1,938,624

DIRECTION FINDER

Thomas Lydwell Eckersley, Weatheroak, Danbury, England, assignor to Radio Corporation of America, a corporation of Delaware Application April 25, 1931, Serial No. 532,726, and in Great Britain May 7, 1930

10 Claims. (Cl. 250—11)

This invention relates to direction finding apparatus and more particularly to direction finding apparatus for use on very short waves, for example, waves of the order of 100 meters or less.

One of the difficulties met with in short wave direction finding is due to the fact that the incoming wave varies in polarization and may be indiscriminately vertically or horizontally polarized. This effect, which is sometimes termed "night effect", results in a variation in apparent bearing which makes accurate directional observation exceedingly difficult and in some cases even impossible, consequently it is necessary to use aerials having shielded horizontal parts. A further difficulty which arises is concerned with the operation of means for indicating the sense of an observed direction. The sense of an observed direction is, as is well known, normally taken by means of an open aerial employed in association with the directional aerial system. Now in order to obtain a practically strong signal and to eliminate " vertical " effects from the directional aerial system, it is desirable to space the aerials in the said system as far apart as is consistent with accuracy and a spacing as great as one third of the working wave length may be used. The aerials in the directional system are normally connected through cables to the ends of a goniometer field coil. In such an arrangement, when the spacing of the aerials becomes comparable with the working wave length, the phase and amplitude of the current in the goniometer field coils relative to the inducing electromotive force becomes a very complicated function of the wave length and if the direction finder as a whole is intended for use over a range of short wave lengths, for example, from 10 to 100 meters, one or more reversals of phase may occur at points in this range.

In view of the similarity between the conductors which form the directional portion of the unidirectional aerial system of the present invention, and the conductors which form the vertical aerial portion of the unidirectional aerial system of the present invention, the terms used to designate the several parts hereinbefore and hereinafter will be defined. Throughout the specification and claims applicant has used the term " vertical open aerial " or " open aerial " to designate the absorbing portion of that aerial which introduces into the system the nondirectional aerial effect. The term " vertical aerial " has been used to designate the absorption conductors which form part of the directional absorption member, that is, the absorption system, the characteristic of which may be represented by a figure 8 or lemniscate.

It will readily be appreciated that when a vertical open aerial is employed in association with a directional aerial system of this kind in order to give a cardioid diagram very great difficulty is experienced in obtaining the necessary balance between the directional and non-directional signals since the relative phase of the current in the vertical aerial and in the directional aerial system will vary rapidly in the neighborhood of particular wave lengths throughout the range. In fact, at or close to these wave lengths it is often impossible to obtain a cardioid balance at all, that is, it is difficult, if not impossible, to phase correctly the current in the vertical aerial.

The principal object of the present invention is to provide a short wave directional receiver which is suitable for use over a reasonably wide short wave length range, say, from 10 to 100 meters and in which these difficulties and disadvantages shall be avoided.

According to this invention the horizontal conductor in a short wave receiving system and all apparatus connected thereto are shielded as completely as possible from the influence of electromagnetic radiation and the open aerial, the effect of which is combined with the effect of the aerials in the directional aerial system to give cardioid balance is made as similar as possible to the aerials in the said directional serial system.

Figure 1:
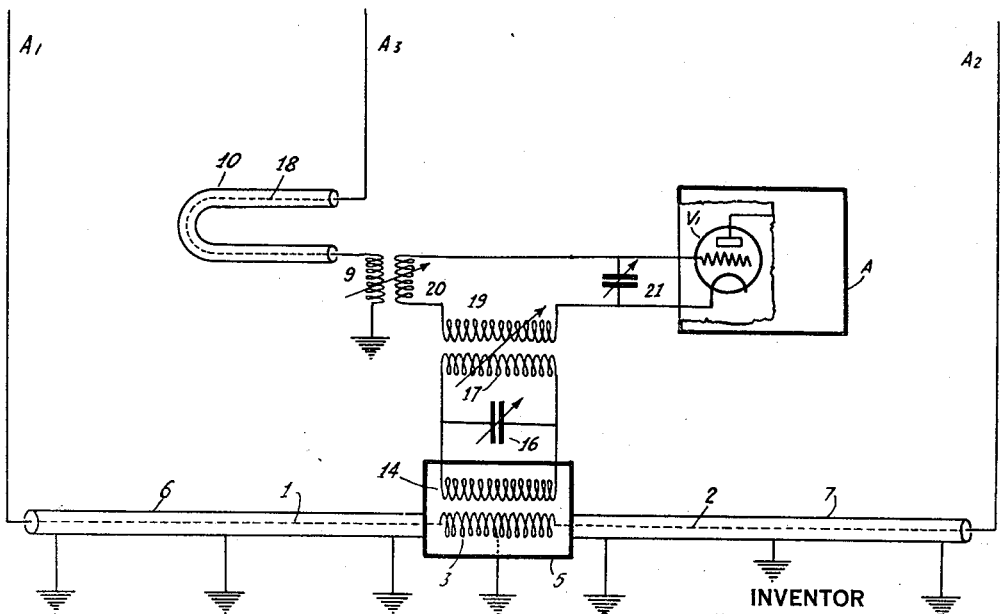

The invention is illustrated in the accompanying diagrammatic drawing. Referring to Figure 1, which shows diagrammatically one way of carrying out the invention, a directional receiving system for use on short waves comprises a pair of vertical aerials $A_1$, $A_2$, each of which is connected at its base to similar horizontal conductors 1 and 2, the two horizontal conductors being connected together through the field coil 3 of a goniometer, the middle point of which may be earthed. The horizontal conductors of the field coil are completely screened by a screening box 5 which surrounds the goniometer field coil and by metal conduits 6 and 7, e. g., copper conduits surrounding the said horizontal conductors, the conduit and the screening box of the field coil being soldered together so as to give absolute metallic continuity and the whole screen being earthed preferably at a plurality of points. $A_1$, $A_2$ together are directive in characteristic and respond most readily to energy coming from a plane passed through the aerials $A_1$, $A_2$ and to a lesser extent as the energy is received from a point removed from said plane. No energy is received from a point at right angles to the plane. An open aerial $A_3$, exactly similar to each of the aerials $A_1$, $A_2$ in the directional system, is employed to obtain the non-directional aerial effect and is connected through a horizontal conductor 8 and then through a coil 9 whose impedance is equal to half of the impedance of the goniometer field coil 3 to earth.

The horizontal conductor 8 and other apparatus associated with the open aerial is screened as completely as possible by a screening box and conduit 10, said screen (not shown) and conduit 10 being earthed. The length of the horizontal conductor 8 and its screen 10 is electrically equivalent to that of the horizontal conductors 1, 2 of the directional aerials and screens 6, 7.

It will be seen that with this arrangement the effective impedance of the open aerial is exactly the same as that of each vertical member $A_1$, $A_2$ of the directional system. Currents from the directional and open aerial systems are combined in the following manner:

The search coil 14, which is coupled to the field coil 3 of the goniometer in the usual way, is tuned by means of a variable condenser 16 and the circuit thus formed is shunted by a coupling coil 17 which is variably coupled to another coil 19 connected in series with yet a further coil 20, the two last mentioned coils being connected between grid and cathode of the first valve $V_1$ in an amplifier A. A variable tuning condenser 21 is connected between said grid and cathode. The coil 20 is variably coupled to the inductance 9. It will be seen that if the circuit is properly adjusted the currents from the directional aerial system and the open aerial may be satisfactorily combined to give the desired result. Final phase adjustment may be made by adjusting the variable condenser 16 connected across the search coil while amplitude adjustment may be made by adjusting either or both the couplings between the coils 9 and 21 between the coils 17 and 19. With the arrangement described it is found possible to obtain an unequivocal cardioid diagram through the whole range of a short wave direction finder.

Figure 2 shows a slight modification of the arrangement shown in Figure 1. As will be seen the coupling system employed in Figure 2 is rather simpler than that employed in Figure 1, the coil 17 being coupled to the coil 20 which is also directly coupled to the coil 9. A further modification incorporated in the arrangement in Figure 2 lies in the method employed for tuning the search coil 14, this coil being tuned by three ganged condensers, a shunt condenser 16 and two other condensers 24, 25. The additional condensers 24, 25 are not necessary and a single shunt condenser 16 may be employed in the arrangement of Figure 2 as in the arrangement of Figure 1.

The shielding of the leads 1, 2, 8 may be accomplished in any convenient manner, for example the said leads and their shields may be constituted by shielded cables, e. g., lead covered paper insulated cables. The arrangement shown in Figure 1 is preferred in practice to that shown in Figure 2 but the said arrangement shown in Figure 2 is easier to consider theoretically.

The following mathematical explanation relating to the arrangement shown in Figure 2 will assist in appreciating the operation of the invention:—

Let $t$ be time
Let $p$ be $2\pi f$
Let $E_1$ be the field intensity at the aerial $A_1$
Let $E_2$ be the field intensity at the aerial $A_2$
Let $E$ be the field intensity at a point half way between the aerials $A_1$ and $A_2$, i. e., at the central open aerials $A_3$ Let $h$ be the height of the aerials $A_1$ $A_2$ $A_3$ (all of equal height)
Let $Z_1$ be half the impedance of the circuit $A_1$, 1, coil 3, 2, $A_2$ ($Z_1$ also equals the impedance of the circuit $A_3$, 8, coil 9 earth)
Let $i_1$ be the current in the coil 3
Let $i_2$ be the current in the coil 17
Let $i_3$ be the current the coil 9
Let $M$ be the mutual inductance between the coils 3 and 14
Let $Z_2$ be the impedance of the circuit including the search coil.
Let $X$ be the distance apart of the aerials $A_1$ $A_2$
Then $$i_1 = \frac{(E_1 - E_2)h}{2Z_1} = \frac{hEX\delta}{2Z_1 x}\sin\left(\frac{2\pi}{\lambda}x - pt\right)$$

$$\therefore i_1 = \frac{hEX2\pi}{2Z_1 \lambda}\cos\left(\frac{2\pi}{\lambda}x - pt\right)$$

The current $$i_3 = \frac{Eh}{Z_1}\sin\left(\frac{2\pi}{\lambda}x - pt\right)$$

$i_1$ and $i_3$ are therefore 90 degrees out of phase, but the current $$i_2 = \frac{M}{Z_2}\frac{\delta i_1}{\delta t} = \frac{-hXE2\pi 2}{Z_2 z_1 \lambda}\sin\left(\frac{2\pi}{\lambda}x - pt\right)$$

is in phase with $i_3$ if $Z_2$ is a pure resistance, i. e., if the search coil circuit is tuned to the incoming wave.

The coils 17 and 9 may therefore be coupled to the coil 20 and a true cardioid balance will be obtained.

For the above reasoning it has been assumed that the search coil circuit does not include the shunt condenser 16, the circuit being regarded for the purposes of theory as consisting of a series load comprising the coil 14, condenser 25, coil 17, and condenser 24, all in series.

Equivalent reasoning, however, applies to the case in which a shunt condenser is employed for tuning the coil 14 since at resonance the current in the coils 17 and 14 (these coils being assumed to be in series and both shunted by a condenser) are in phase.

Having thus described my invention and the operation thereof, what I claim is:

1. A short wave aerial system comprising a pair of spaced vertical aerials each connected at its base through a similar screened conductor to one or other of the ends of a screened goniometer field coil, an additional open aerial situated midway between the spaced aerials, said additional open aerial being as nearly as possible similar to said spaced aerials, a screened horizontal conductor system connecting the base of said additional open aerial through an impedance coil to earth and means for combining voltages set up in said impedance coil with those derived from the search coil of the goniometer, the arrangement being such that the impedance of the circuit consisting of one spaced aerial, its associated horizontal conductor, and half the field coil is equal to the impedance of the circuit consisting of the other spaced aerial, its associated horizontal conductor, and the other half of the goniometer field coil, which impedance is in turn equal to the impedance of the circuit consisting of the additional open aerial, its associated horizontal conductor, and associated impedance coil.

2. An arrangement as claimed in claim 1 and in which the voltages set up in the open aerial impedance coil and the goniometer search coil are combined in a circuit through independently variable couplings, substantially as and for the purpose described.

3. An arrangement as claimed in claim 1 and in which the radio goniometer field coil is earthed at its midpoint.

4. An aerial system for a short wave radio signaling comprising, a translating circuit, a plurality of spaced vertical aerials connected by horizontal conductors for directional signaling, means in said conductors for coupling said aerials to said translating circuit, an open vertical aerial for use in combination with said spaced vertical aerials for producing a unidirectional signaling characteristic, said open aerial being coupled by way of a horizontal conductor system with said translating circuit, and a separate electromagnetic shield for each of said horizontal conductors.

5. A short wave aerial system comprising, a pair of spaced vertical aerials each connected at its base to a horizontal conductor, a lumped inductance connected between said conductors, separate shielding means for each of said horizontal conductors and for said inductance, an additional nondirectional vertical aerial substantially similar to said spaced vertical aerial and arranged symmetrically with respect thereto, a combining circuit, a horizontal conductor including a lumped inductance for coupling said last named aerial to said combining circuit, shielding means for said horizontal conductor, and means for coupling the first named lumped inductance to said combining circuit.

6. An arrangement as claimed in claim 5 in which said lumped inductance is connected at its electrical center to ground.

7. A directional receiving system comprising a receiver having an input inductance, a plurality of spaced vertical aerials, an impedance connecting at least two of said aerials together, an impedance connecting another of said aerials to ground, coupling means between each of said impedances and the inductance of said receiver input circuit, and means for connecting the electrical center of said first named impedance to ground to balance the directive effect of said receiver.

8. An arrangement as claimed in claim 7 in which each of said spaced vertical aerials comprises a vertical portion and a horizontal portion, and in which each of said horizontal portions is enclosed in a separate electromagnetic shield.

9. An arrangement as claimed in claim 7 in which each of said spaced vertical aerials comprises a vertical portion and a horizontal portion and in which each of said horizontal portions is enclosed in a separate electromagnetic shield, and in which said first named impedance is enclosed in a separate electromagnetic shield.

10. An arrangement as claimed in claim 4 in which said electromagnetic shields are connected to ground.

THOMAS LYDWELL ECKERSLEY.